United States Patent Office 3,060,218
Patented Oct. 23, 1962

3,060,218
METHOD FOR PREPARING ORGANOBORON COMPOUNDS
George W. Willcockson, Anaheim, Calif., assignor to United States Borax & Chemical Corporation, Los Angeles, Calif., a corporation of Nevada
No Drawing. Filed Apr. 20, 1959, Ser. No. 807,339
7 Claims. (Cl. 260—462)

This invention relates as indicated to a method for preparing organoboron compounds and has particular reference to boron halide reactions with olefins.

The addition of diborane and diboron tetrachloride to carbon-carbon multiple bonds are known to those skilled in the art and such reactions have been reported in the literature. However, such methods are economically undesirable due to the high cost of the boron materials.

I have found that boron tribromide and boron trichloride will react with olefinic hydrocarbons to yield organoboron compounds of the type R—$BX_2$ where R is a cyclohexenyl, cyclohexyl, vinyl, or an ethyl radical; and $X_2$ is $Cl_2$ or $Br_2$. The R—$BX_2$ materials can be readily converted to R—BY materials where Y is $(OH)_2$, $(OR)_2$ or O.

It is therefore the principal object of the present invention to provide a novel process for the preparation of boron-carbon compounds.

It is another object of the present invention to provide as new compositions of matter cyclohexenylboron compounds and vinylboron dichloride.

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few ways in which the principle of the invention may be employed.

Broadly stated, the present invention comprises the method of producing boron-carbon compounds of the type $$R—BX_2$$

wherein R is a radical selected from the group consisting of cyclohexenyl, cyclohexyl, vinyl and ethyl, and wherein X is a halide selected from the group consisting of bromine and chlorine, which comprises reacting a halide selected from the group consisting of boron tribromide and boron trichloride with an olefinic material selected from the group consisting of cyclohexane and ethylene.

The reaction of the foregoing broadly stated paragraph can best be illustrated by the following general reaction:

$$\text{Olefin} + BX_3 \rightarrow R'BX_2 + R''BX_2$$

where the olefin is cyclohexene or ethylene, X is bromine or chlorine, R' is cyclohexenyl or vinyl, and R" is cyclohexyl or ethyl. It now becomes self-evident that the present reaction results in a mixture of two products.

In the instance where the olefin is cyclohexene, the two products comprise a mixture of 1-cyclohexeneylboron dihalide and cyclohexylboron dihalide; the halide of course being either chloride or bromide. These products can be separated by a careful fractional distillation under nitrogen, or the products can be hydrolyzed and the resultant 1-cyclohexenylboronic acid and cyclohexylboronic acid separated by fractional crystallization. As a further step, the boronic acids produced by the hydrolysis can be dehydrated by any of the well-known means, and converted to the corresponding tri-1-cyclohexeneylboroxine and tricyclohexylboroxine. Still further these products can be esterified with the lower alcohols and the resultant esters separated by fractionation.

When the olefin used in the present invention is ethylene the products comprise a mixture of ethylboron dihalide and either a vinylboron dihalide or a boron containing polymer depending upon the reaction conditions. I have found that with the present reaction when ethylene is used as one of the reactants, reaction in a static system under pressure gives a boron containing polymer and ethylboron dihalide, whereas reaction in a flow-type system yields both the vinyl- and ethylboron dihalides. Thus while the reaction between ethylene and boron halide produces two products, which are separable, the unsaturated carbon-boron compound becomes a polymeric material under certain conditions; however, the ethylboron dihalide produced can be readily converted to the corresponding boronic acid, lower alkyl ester or the boroxine as discussed above when cyclohexene is used as the olefinic material.

I have further found that the present reaction can be catalyzed by such materials as $AlX_3$ and $HgX_2$, where X is chlorine or bromine and also by activated carbon.

The compounds produced by the present reaction have excellent phytotoxic properties and have utility as herbicides alone or in combination with other well-known organic and inorganic herbicidal materials. The present compounds are also active chemical intermediates and can be used, for example, in the production of borazoles and trialkyl boranes, and additionally are active monomers for the production of polymeric materials.

So that the present invention can be more easily understood, the following illustrative examples are given:

I

Boron tribromide, 25 ml. (0.268 mol), was distilled into a calibrated receiver and added, via an ice water cooled reflux condenser, to a reaction flask which contained 125 ml. (1.24 mols) of purified cyclohexene. The mixture was stirred for about 10 hours at about 70–122° C. while being maintained under a purge of nitrogen. The effluent nitrogen and gaseous products were passed through the reflux condenser, a calcium chloride drying tube, and into a water trap.

At the conclusion of the reaction period the resultant mass, which comprised a mixture of cyclohexylboron dibromide and 1-cyclohexenylboron dibromide, was cooled to room temperature. It will be understood that at this point these products can be isolated, as for example, by distillation under nitrogen.

The mixture was then poured slowly with vigorous agitation into an ice water-ether mixture. The layers were separated and the aqueous layer was extracted with three 150 ml.-portions of ether. The combined ether extracts were then extracted with four 250 ml.-portions of 2.5% sodium hydroxide.

The basic extract was then acidified and extracted with ether. Evaporation of the ether under reduced pressure gave a white solid residue.

This white solid residue was recrystallized from water to give colorless plates whose boron analysis was consistent with either 1-cyclohexenyl- or cyclohexylboronic acid. This product was proven to be primarily a mixture of the 1-cyclohexenyl- and cyclohexlboronic acid by (1) oxidation with hydrogen peroxide to give both cyclohexanol and cyclohexanone, (2) infrared spectra, and (3) hydrogenation studies. Further, it has been shown that these boronic acids can be separated by fractional recrystallization.

The boronic acids also have been readily converted to the (1) anhydride (boroxine), (2) diethanolamine ester, and (3) the dibutyl ester by known procedures.

II

Example I was repeated and the white solid residue was esterified with n-butanol. The resultant product was a colorless liquid having a B.P. 108–111°/2–3 mm.

Oxidation of the distilled mixture of dibutyl esters with hydrogen peroxide yielded both cyclohexanol and cyclohexanone, again proving the presence of both the cyclohexyl- and the 1-cyclohexenylboron compounds. Again the boron analysis was consistent with either the cyclohexylborane or cyclohexenylborane.

III

Example I was repeated except in this instance AlBr₃ catalyst was added to the cyclohexene before the addition of the BBr₃. The catalyst was added in the amount of 0.0045 mol per 0.268 mol of BBr₃.

The addition of the catalyst gave a 1.5-fold increase in yield over a control reaction where no catalyst was used.

The resultant products were the same as in Example I.

IV

Example I was repeated except 0.0055 mol in HgBr₂ per 0.268 mol of BBr₃ was added as catalyst. In this instance the catalyst gave a 3-fold increase in yield.

V

A 500 ml. three-necked flask was equipped with (1) an ice water cooled reflux condenser with an attached Dry Ice-acetone cooled Dewar-type condenser, (2) an ice water cooled, calibrated addition funnel with an attached gas inlet tube and Dry Ice-acetone cooled Dewar-type condenser, and (3) a thermometer.

The apparatus was purged with nitrogen (dried over calcium hydride), and additioinally flame dried before the addition of 250 ml. (2.5 mols) of purified cyclohexene. Purified boron trichloride was vaporized into the calibrated addition funnel and added to the cyclohexene. A slow nitrogen purge was maintained and the exit gases were passed through a Dry Ice-acetone trap, calcium chloride drying tube and into a water trap. The reaction mixture was stirred and heated at reflux (about 71–81° C.) for about 24 hours.

The resultant mixture of 1-cyclohexenylboron dichloride and cyclohexylboron dichloride was hydrolyzed and esterified as described in the foregoing examples and the products obtained were the same as noted above.

VI

Example V was repeated, except 0.0074 mol of HgCl₂ on carbon catalyst per 0.217 mol of BCl₃ was added to cyclohexene prior to the addition of the BCl₃. The use of the catalyst gave an increased yield and shortened reaction time.

VII

Example V was repeated using 60 grams of activated carbon as the catalyst. The results were comparable to those of Example VI.

VIII

A 1000 ml. Parr bomb was charged with 150 ml. of dry, purified heptane and 15 ml. (0.158 mol) of BBr₃. The bomb was sealed, cooled in Dry Ice and purged with nitrogen. The bomb was then evacuated and filled with ethylene to a pressure of about 750 p.s.i.g. and then heated on a rocking autoclave for about 13 hours.

The reaction resulted in a polymeric material and ethylboron dibromide dissolved in heptane. The ethylboron dibromide in heptane was separated from the polymeric material by distillation. The ethylboron dibromide was separated from the heptane by hydrolysis, by pouring the distilled fraction into ice water (under nitrogen). The aqueous layer was extracted with ether and the ether extract was then treated with 2.5% aqueous sodium hydroxide. This basic extract was acidified and extracted with ether. This ether extract was then distilled under nitrogen until the volume was reduced to about 50 ml. benzene (10 ml.), and 0.5 ml. of water was then added and the remaining ether was distilled. On cooling the benzene solution, crystals separated.

These crystals melt at 86–89° C. (in a sealed tube under nitrogen) and proved to be ethylboronic acid by infrared spectrum and chemical analysis.

The theoretical analysis for C₂H₇O₂B is C, 32.50; H, 9.55; B, 14.64; actual analysis showed C, 32.40; H, 9.53; B, 15.00.

IX

A mixture of ethylene and boron trichloride (3:1 molar ratio) was passed over a bed of activated carbon (activated at 300° C. and 0.03 mm. Hg and saturated with ethylene) at 100–300° C. The exit gas stream, containing product and unreacted starting materials, was trapped in a −80° C. trap. The infrared spectra of the product showed the presence of both vinylboron and ethylboron dihalide products.

Further product was recovered from the activated charcoal. Infrared spectra, hydrolysis, analyses, etc., showed this material also to be primarily a mixture of vinyl- and ethylboron dichloride.

The vinyl- and ethylboron dichloride can be separated and purified by fractional distillation, the vinylboron dichloride distilling at a lower temperature than the ethylboron dichloride.

The organoboron products of this reaction are spontaneously inflammable in air.

Other modes of applying the principle of the invention may be employed provided the features stated in any of the claims or the equivalent of such be employed.

I, therefore, particularly point out and claim as my invention:

1. The method of producing boron-carbon compounds of the type

$$R—BX_2$$

wherein R is a radical selected from the group consisting of cyclohexenyl, cyclohexyl, vinyl and ethyl, and X is a halide selected from the group consisting of bromine and chlorine, which comprises reacting a boron halide selected from the group consisting of boron tribromide and boron trichloride with an olefinic material selected from the group consisting of cyclohexene and ethylene.

2. The method of producing 1-cyclohexenylboron dihalide and cyclohexylboron dihalide which comprises reacting cyclohexene with a boron halide selected from the group consisting of boron tribromide and boron trichloride, and separating the resultant 1-cyclohexenylboron dihalide and cyclohexylboron dihalide by distillation.

3. The method of producing ethylboron dihalide and vinylboron dihalide which comprises reacting ethylene with a boron halide selected from the group consisting of boron tribromide and boron trichloride, and separating the resultant ethylboron dihalide and vinylboron dihalide by distillation.

4. The method of producing 1-cyclohexenylboronic acid and cyclohexylboronic acid which comprises reacting cyclohexene with a boron halide selected from the group consisting of boron tribromide and boron trichloride, hydrolyzing the resultant reaction mixture, and separating the said boronic acids by fractional recrystallization.

5. The method of producing ethylboronic acid and a polymeric material which comprises reacting ethylene with a boron halide selected from the group consisting of boron tribromide and boron trichloride hydrolyzing the resultant reaction mixture and isolating the ethylboronic acid from the hydrolyzed mixture.

6. The method of producing lower alkyl 1-cyclohexenylboronate and lower alkyl cyclohexylboronate esters which comprises reacting cyclohexene with a boron halide selected from the group consisting of boron tribromide and boron trichloride, esterifying the resultant reaction mixture with a lower alcohol and separating the resultant esters by fractional distillation.

7. The method of producing lower alkyl ethylboronate esters and vinylboronate esters which comprises esterifying the ethylboron dihalide and vinylboron dihalide of claim 3 with a lower alcohol.

References Cited in the file of this patent

UNITED STATES PATENTS

| | | |
|---|---|---|
| 2,862,952 | Groszos | Dec. 2, 1958 |
| 2,900,414 | Muetterties | Aug. 18, 1959 |
| 2,915,543 | Groszos | Dec. 1, 1959 |
| 2,921,954 | Ransden | Jan. 19, 1960 |

OTHER REFERENCES

Lappert: Chem. Reviews, vol. 56, pp. 986–7 and 1004 (1956).